(12) United States Patent
Fleischman et al.

(10) Patent No.: US 8,135,865 B2
(45) Date of Patent: Mar. 13, 2012

(54) SYNCHRONIZATION AND TRANSFER OF DIGITAL MEDIA ITEMS

(75) Inventors: David Fleischman, Gilroy, CA (US); Christopher R. Wysocki, Los Gatos, CA (US); Payam Mirrashidi, San Francisco, CA (US); Sean Kelly, Cupertino, CA (US); Charles Pisula, San Jose, CA (US); Alan Ward, Boulder, CO (US); Colin Meldrum, Berkeley, CA (US); Patrice Gautier, San Francisco, CA (US); Jeffrey Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 12/204,779

(22) Filed: Sep. 4, 2008

(65) Prior Publication Data

US 2009/0063660 A1    Mar. 5, 2009

Related U.S. Application Data

(60) Provisional application No. 60/969,947, filed on Sep. 4, 2007.

(51) Int. Cl.
*G06F 15/16* (2006.01)

(52) U.S. Cl. ........ 709/248; 709/203; 709/212; 709/216; 709/226; 707/610; 707/640; 707/661

(58) Field of Classification Search .................. 709/212, 709/232, 248, 216, 226, 203; 707/610, 640, 707/661
See application file for complete search history.

(56) References Cited

U.S. PATENT DOCUMENTS

| | | | |
|---|---|---|---|
| 6,061,714 A * | 5/2000 | Housel et al. ................. | 709/203 |
| 6,772,338 B1 * | 8/2004 | Hull .............................. | 713/168 |
| 7,076,553 B2 * | 7/2006 | Chan et al. ..................... | 709/226 |
| 7,277,950 B1 * | 10/2007 | Chapweske .................... | 709/227 |
| 7,433,928 B1 * | 10/2008 | Ranade et al. ................. | 709/216 |
| 7,500,020 B1 * | 3/2009 | Kabra et al. ................... | 709/248 |
| 7,620,680 B1 * | 11/2009 | Lamport ....................... | 709/201 |
| 7,634,787 B1 * | 12/2009 | Gebhardt et al. ............... | 725/36 |
| 7,657,581 B2 * | 2/2010 | Orenstein et al. ............. | 707/661 |
| 7,660,831 B2 * | 2/2010 | Freedman ...................... | 707/621 |
| 7,739,410 B2 * | 6/2010 | Freedman ...................... | 709/248 |
| 7,752,166 B2 * | 7/2010 | Quinlan et al. ................ | 707/613 |
| 7,761,414 B2 * | 7/2010 | Freedman ...................... | 707/610 |
| 7,765,411 B2 * | 7/2010 | Hennessey et al. ............ | 713/193 |
| 7,778,962 B2 * | 8/2010 | Shah et al. ..................... | 707/610 |
| 7,778,971 B2 * | 8/2010 | Freedman et al. ............. | 707/620 |
| 7,797,458 B2 * | 9/2010 | Mizukami ..................... | 709/248 |
| 2003/0084165 A1 * | 5/2003 | Kjellberg et al. ............. | 709/227 |
| 2003/0188303 A1 * | 10/2003 | Barman et al. ................ | 717/170 |
| 2005/0086384 A1 * | 4/2005 | Ernst ............................. | 709/248 |
| 2005/0203682 A1 * | 9/2005 | Omino et al. .................. | 701/24 |
| 2006/0236325 A1 * | 10/2006 | Rao et al. ...................... | 719/315 |
| 2007/0049277 A1 * | 3/2007 | Nakamata et al. ............. | 455/436 |
| 2007/0055836 A1 * | 3/2007 | Yamato et al. ................. | 711/162 |
| 2008/0155057 A1 * | 6/2008 | Khedouri et al. .............. | 709/217 |
| 2008/0162666 A1 * | 7/2008 | Ebihara et al. ................ | 709/217 |
| 2008/0176540 A1 * | 7/2008 | Khedouri et al. .......... | 455/414.1 |
| 2009/0083441 A1 * | 3/2009 | Clark et al. .................... | 709/248 |

* cited by examiner

*Primary Examiner* — Michael Won
(74) *Attorney, Agent, or Firm* — Fish & RIchardson P.C.

(57) ABSTRACT

Methods, systems, and apparatus, including computer program products, for synchronizing and transferring digital media items. One or more media items are received, from a network operating environment, at a first device. A first media database on the first device, including metadata associated with the media items, is synchronized with a second media database on a second device. The one or more media items are moved from the first device to the second device. The one or more media items are copied from the second device to the first device.

12 Claims, 8 Drawing Sheets

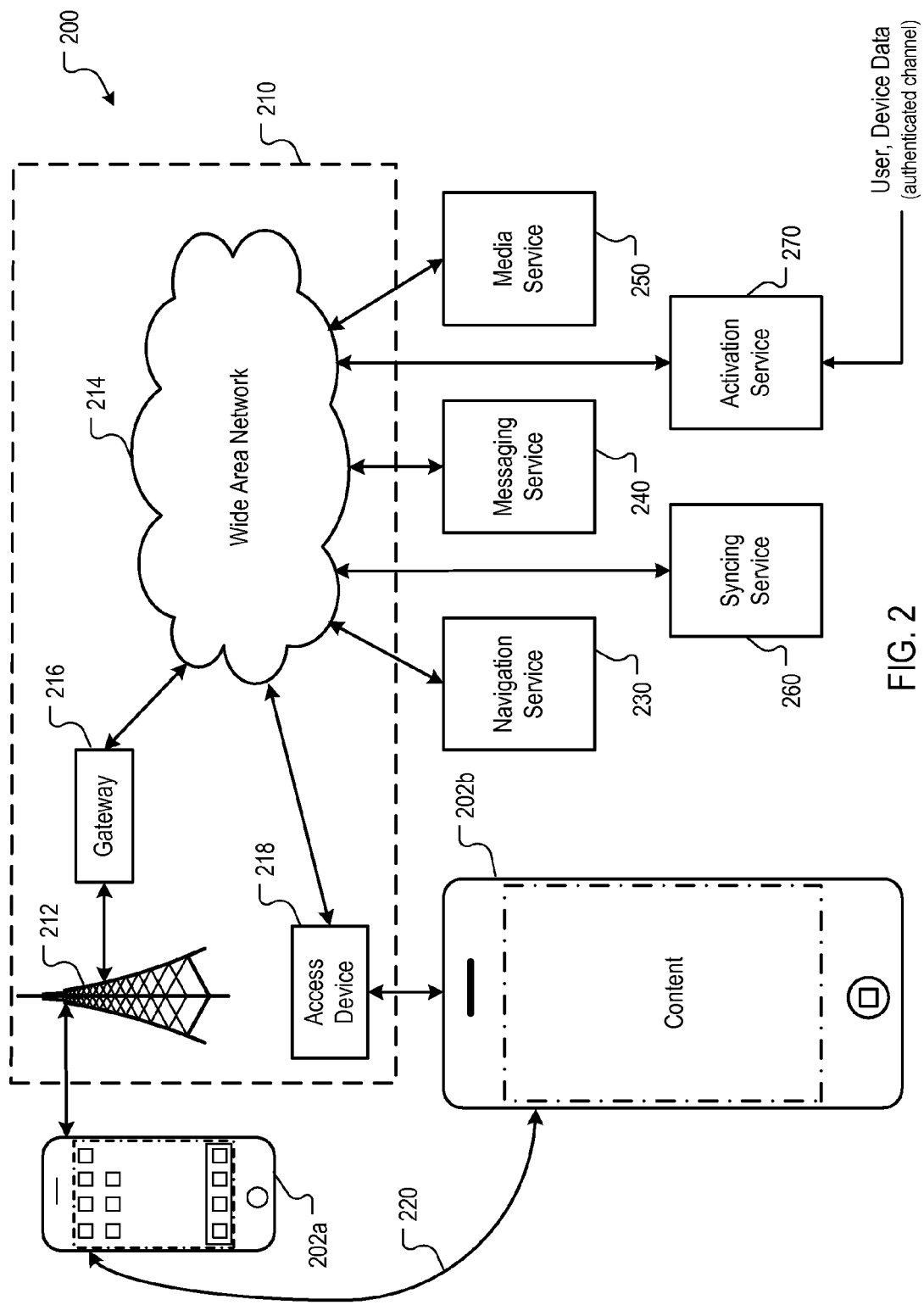

SYNCHRONIZATION AND TRANSFER OF DIGITAL MEDIA ITEMS

RELATED APPLICATIONS

This application claims the benefit under 35 U.S.C. §119 of U.S. Provisional Application No. 60/969,947, titled "Synchronization and Transfer of Digital Media Items," filed Sep. 4, 2007, which is incorporated by reference herein in its entirety.

BACKGROUND

The subject matter of this specification relates generally to digital media distribution services.

In recent years, electronic online distribution of media items, such as music and movies, have become popular. A user can access a media service from a client-side application on a computer. The user can purchase media items from the media service and download them to the computer. The downloaded media items can be copied to a tethered device, such as a portable media player. This procedure for obtaining media items forces the user to be in front of a computer whenever they wish to obtain new media items.

SUMMARY

In general, one aspect of the subject matter described in this specification can be embodied in methods that include the actions of receiving, from a network operating environment, one or more media items at a first device; synchronizing a first media database on the first device, including metadata associated with the media items, with a second media database on a second device; moving the one or more media items from the first device to the second device; and copying the one or more media items from the second device to the first device. Other embodiments of this aspect include corresponding systems, apparatus, devices, computer program products, and computer readable media.

In general, another aspect of the subject matter described in this specification can be embodied in methods that include the actions of synchronizing a first media queue on a first device with a second media queue on a second device, identifying one or more media items in the synchronized second media queue whose downloads are incomplete, and initiating downloads of the identified media items to the second device. Other embodiments of this aspect include corresponding systems, apparatus, devices, computer program products, and computer readable media.

Particular embodiments of the subject matter described in this specification can be implemented to realize one or more of the following advantages. Downloading, at a portable device, of digital media items that were interrupted can be completed at a computer to which the portable device is tethered. Media items obtained through a device can be synchronized back to a computer to which the device is coupled (e.g., tethered, wireless). Media items that are impractical for downloading (e.g., due to size) to a device can be requested through the device and downloaded at a computer to which the device is coupled.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a block diagram of an example network operating environment for the mobile devices of FIGS. 1A-1B.

Like reference numbers and designations in the various drawings indicate like elements.

DETAILED DESCRIPTION

Example Mobile Device

Figure 1A:
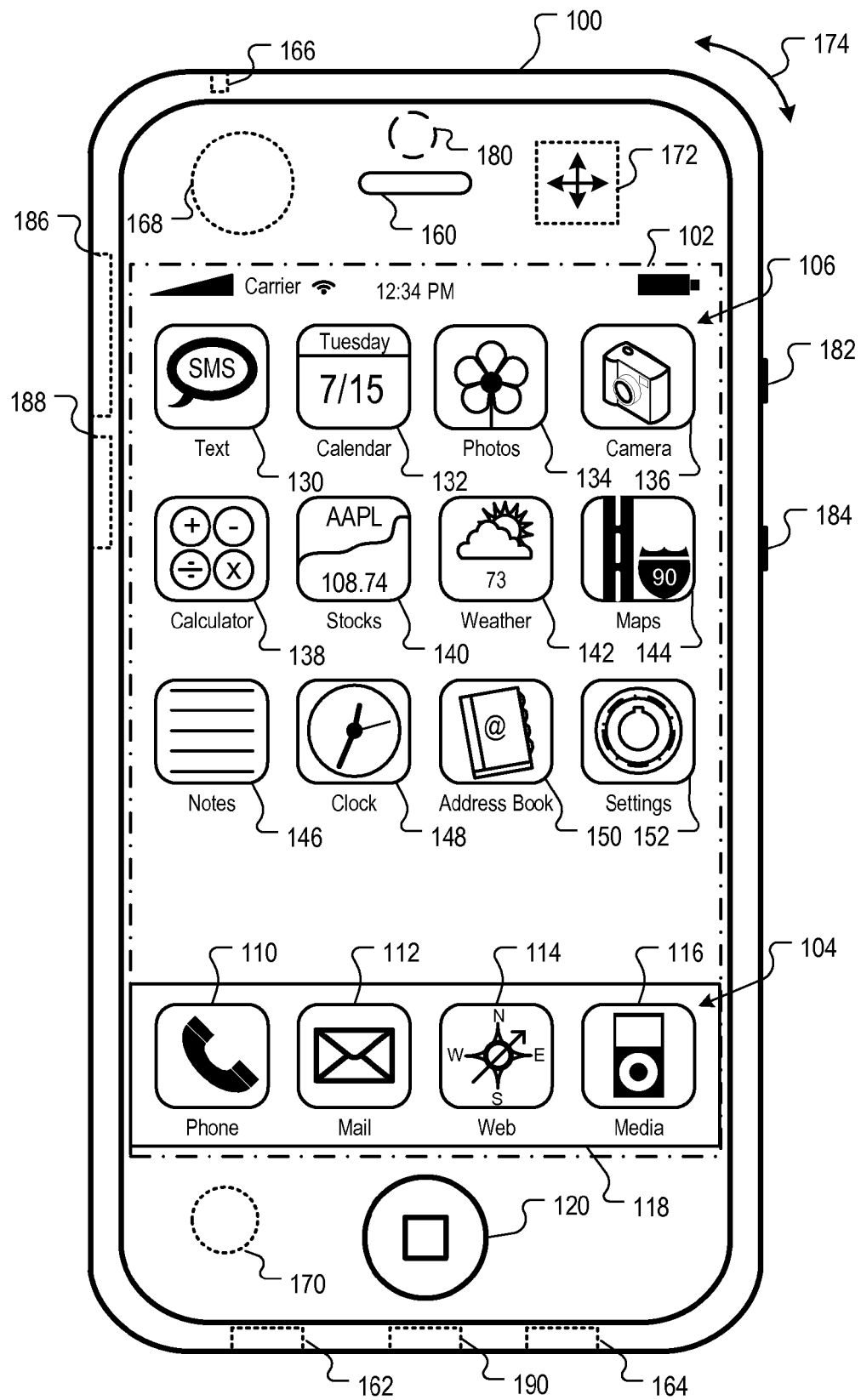
FIG. 1A is a block diagram of an example mobile device with telephony capability.

FIG. 1A is a block diagram of an example mobile device 100. The mobile device 100 can be, for example, a handheld computer, a laptop computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106 are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1A. Touching one of the objects 110, 112, 114, or 116 can, for example, invoke corresponding functionality.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1A can be restored by pressing a button 120 located near the bottom of the mobile device 100. In some implementations, each corresponding device functionality may have corresponding "home" display objects displayed on the touch-sensitive display 102, and the graphical user interface environment of FIG. 1A can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 132, 134, 136, 138, 140, 142, 144, 146, 148, 150, and 152 can invoke a corresponding object environment and functionality.

Additional and/or different display objects can also be displayed in the graphical user interface of FIG. 1A. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Example Mobile Device

Figure 1B:
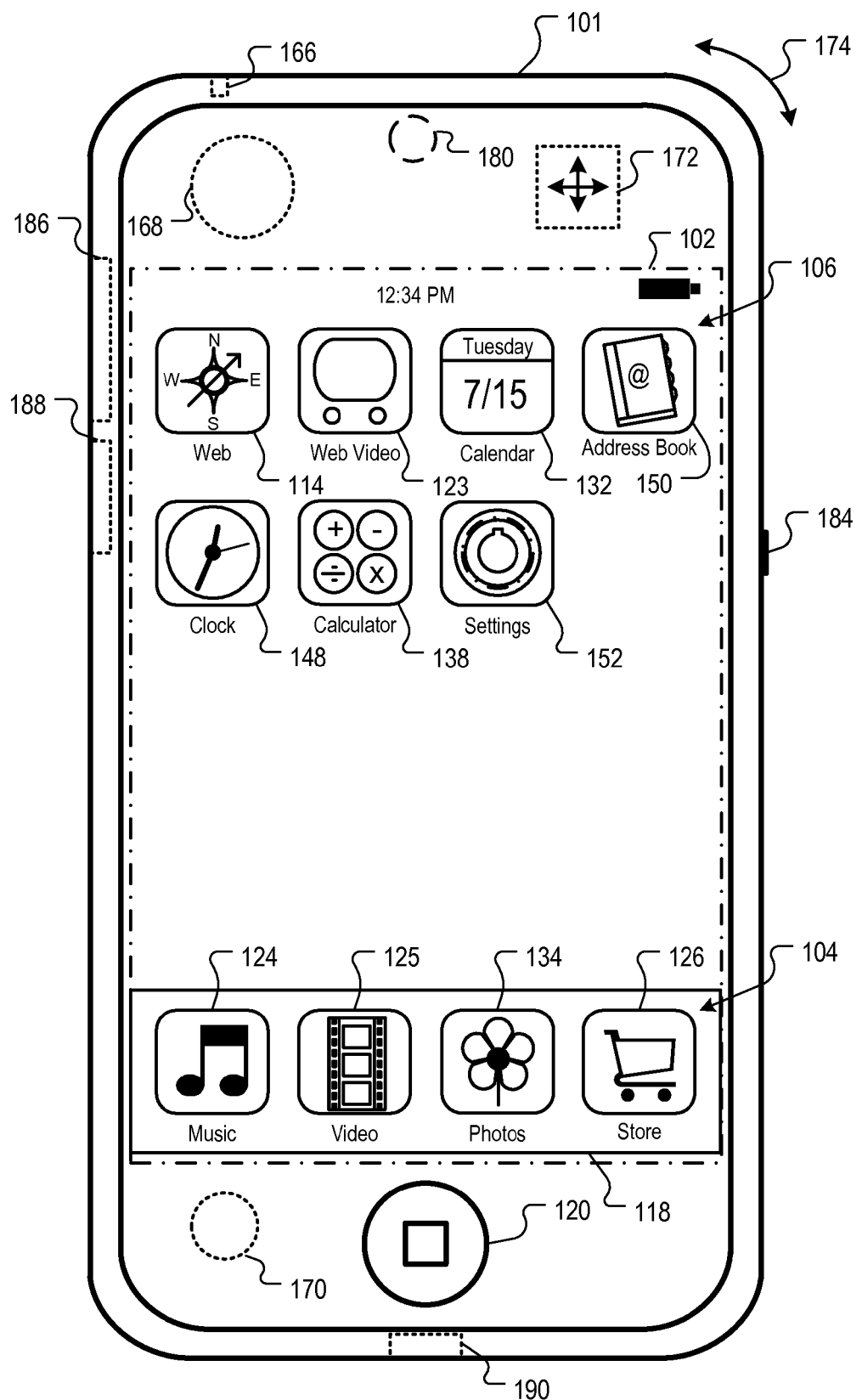
FIG. 1B is a block diagram of an example mobile device without telephony capability.

FIG. 1B is a block diagram of an example mobile device 101. The mobile device 101 can be, for example, a handheld computer, a laptop computer, a personal digital assistant, a network appliance, a camera, a network base station, a media player, a navigation device, an email device, a game console, or a combination of any two or more of these data processing devices or other data processing devices. In some implementations, device 101 shown in FIG. 1B is an example of how device 100 can be configured to display a different set of objects. In some implementations, device 101 has a different set of device functionalities than device 100 shown in FIG. 1A, but otherwise operates in a similar manner to device 100.

Mobile Device Overview

In some implementations, the mobile device 101 includes a touch-sensitive display 102, which can be sensitive to haptic and/or tactile contact with a user. In some implementations, the mobile device 101 can display one or more graphical user interfaces on the touch-sensitive display 102 for providing the user access to various system objects and for conveying information to the user.

Mobile Device Functionality

In some implementations, the mobile device 101 can implement multiple device functionalities, such as a music processing device, as indicated by the music player object 124, a video processing device, as indicated by the video player object 125, a digital photo album device, as indicated by the photos object 134, and a network data communication device for online shopping, as indicated by the store object 126. In some implementations, particular display objects 104, e.g., the music player object 124, the video player object 125, the photos object 134, and store object 126, can be displayed in a menu bar 118. In some implementations, device functionalities can be accessed from a top-level graphical user interface, such as the graphical user interface illustrated in FIG. 1B. Touching one of the objects 124, 125, 134, or 126 can, for example, invoke corresponding functionality.

In some implementations, the top-level graphical user interface of mobile device 101 can include additional display objects 106, such as the Web object 114, the calendar object 132, the address book object 150, the clock object 148, the calculator object 138, and the settings object 152 described above with reference to mobile device 100 of FIG. 1A. In some implementations, the top-level graphical user interface can include other display objects, such as a Web video object 123 that provides functionality for uploading and playing videos on the Web. Each selection of a display object 114, 123, 132, 150, 148, 138, and 152 can invoke a corresponding object environment and functionality.

Additional and/or different display objects can also be displayed in the graphical user interface of FIG. 1B. In some implementations, the display objects 106 can be configured by a user. In some implementations, upon invocation of device functionality, the graphical user interface of the mobile device 101 changes, or is augmented or replaced with another user interface or user interface elements, to facilitate user access to particular functions associated with the corresponding device functionality.

In some implementations, the mobile device 101 can include audio jack 166, a volume control device 184, sensor devices 168, 170, 172, and 180, wireless communication subsystems 186 and 188, and a port device 190 or some other wired port connection described above with reference to mobile device 100 of FIG. 1A.

Network Operating Environment

FIG. 2 is a block diagram of an example network operating environment 200. In FIG. 2, mobile devices 202a and 202b each can represent mobile device 100 or 101. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIGS. 1A-1B. Other communication protocols and topologies can also be implemented.

The mobile device 202a or 202b can, for example, communicate with one or more services 230, 240, 250, 260, and 270 over the one or more wired and/or wireless networks 210. For example, a navigation service 230 can provide navigation information, e.g., map information, location information, route information, and other information, to the mobile device 202a or 202b. A user of the mobile device 202b can invoke a map functionality, e.g., by pressing the maps object 144 on the top-level graphical user interface shown in FIG. 1A, and can request and receive a map for a particular location.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching the Web object 114.

Example Mobile Device Architecture

Figure 3:
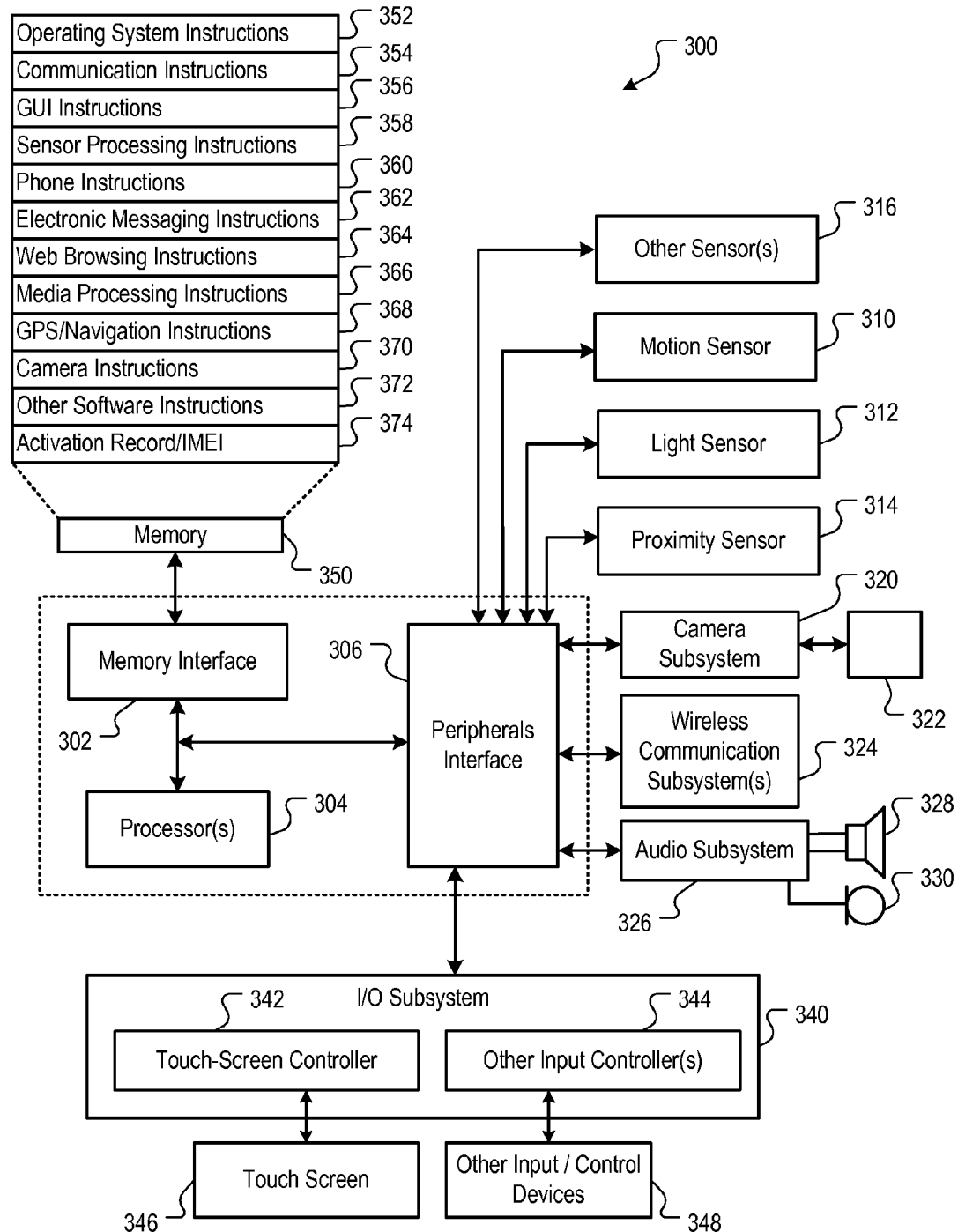
FIG. 3 is a block diagram of an example implementation of the mobile devices of FIGS. 1A-1B.

FIG. 3 is a block diagram 300 of an example implementation of the mobile devices 100 and 101 of FIGS. 1A-1B, respectively. The mobile device 100 or 101 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 or 101 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1A. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 or 101 is intended to operate. For example, a mobile device 100 or 101 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 or 101 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 or 101 on or off. The user may be able to customize a functionality of one or more of the buttons. The touch screen 346 can, for example, also be used to implement virtual or soft buttons and/or a keyboard.

In some implementations, the mobile device 100 or 101 can present recorded audio and/or video files, such as MP3, AAC, and MPEG files. In some implementations, the mobile device 100 or 101 can include the functionality of an MP3 player, such as an iPod™. The mobile device 100 or 101 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions, e.g., security processes and functions as described in reference to FIGS. 4A and 4B. The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 or 101 may be implemented in hardware and/or in software, including in one or more signal processing and/or application specific integrated circuits.

Software Stack and Security Process

Figure 4A:
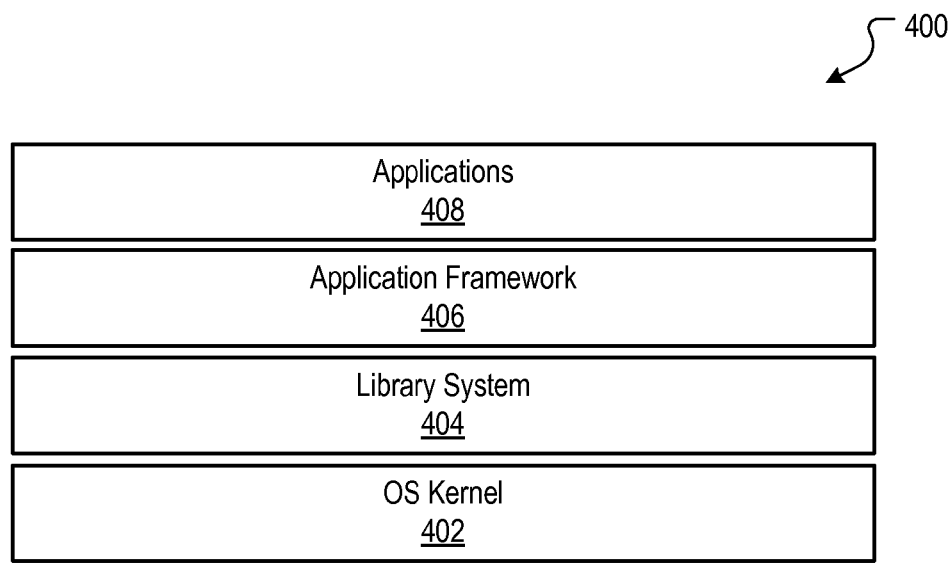
FIG. 4A illustrates an example implementation of a software stack for the mobile devices of FIGS. 1A-1B

FIG. 4A illustrates an example implementation of a software stack 400 for the mobile devices of FIGS. 1A-1B. In some implementations, the software stack 400 includes an operating system (OS) kernel 402 (e.g., a UNIX kernel), a library system 404, an application framework 406 and an applications layer 408.

The OS kernel 402 manages the resources of the mobile device 100 or 101 and allows other programs to run and use these resources. Some examples of resources include a processor, memory, and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100 or 101. When the mobile device 100 or 101 is turned on, a boot loader starts executing the kernel 102 in supervisor mode. The kernel then initializes itself and starts one or more processes for the mobile device 100 or 101, including a security process 410 for remote access management, as described in reference to FIG. 4B.

The library system 404 provides various services applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIGS. 1A-1B (e.g., email, media player, Web browser, phone, music player, video player, photos, and store).

Secure Communication Channel

Figure 4B:
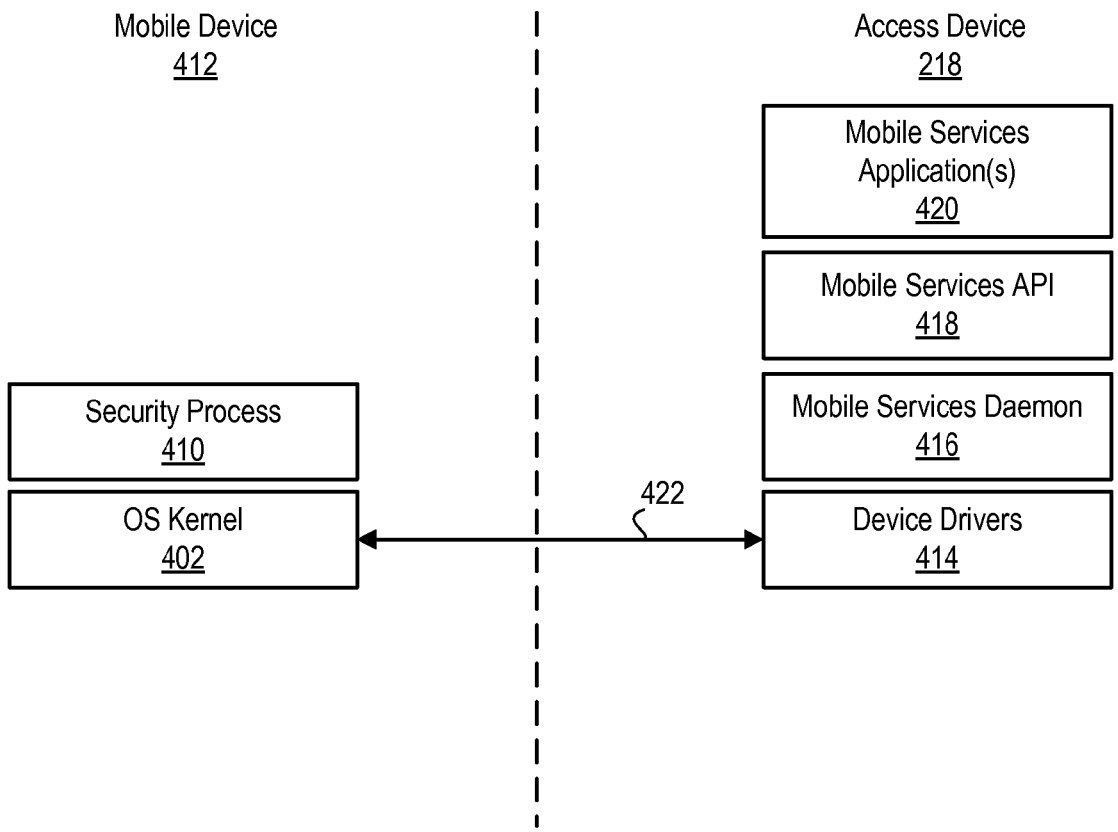
FIG. 4B illustrates an example implementation of a security process for remote access management over a secure communications channel.

FIG. 4B illustrates an example implementation of a security process 410 for remote access management over a secure communications channel 422. In the example shown, the mobile device 412, e.g., mobile device 100 or 101, is running the security process 410, which communicates with the OS kernel 402. Any remote access requests made to the kernel 402 are intercepted by the security process 410, which is responsible for setting up secure communication sessions between the mobile device 412 and a mobile services access device 218. In some implementations, the process 410 uses a cryptographic protocol, such as Secure Sockets Layer (SSL) or Transport Layer Security (TLS) to provide secure communications between the mobile device 412 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). In some implementations, a device activation process can be used, as described in co-pending U.S. patent application Ser. No. 11/767,447, filed Jun. 22, 2007, for "Device Activation and Access," which patent application is incorporated by reference herein in its entirety. The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 412 that uses the iTunes™ client is the iPod™ product developed by Apple Inc. Another example of a mobile device 412 that uses the iTunes™ client is the iPhone™ product developed by Apple Inc.

In an example operational mode, a user connects the mobile device 412 to the access device 218 using, for example, a USB cable. In some other implementations, the mobile device 412 and access device 218 include wireless transceivers for establishing a wireless link (e.g., Wi-Fi). The drivers 414 and kernel 408 detect the connection and alert the security process 410 and mobile services daemon 416 of the connections status. Once the connection is established certain non-sensitive information can be passed from the mobile device 412 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 412 and access device 218 will negotiate a cipher suite to be used during data transfer, establish and share a session key, and authenticate the access device 218 to the mobile device 412. In some implementations, if the mobile device 412 is password protected, the security process 410 will not establish a session, and optionally alert the user of the reason for failure.

Once a secure session is successfully established, the mobile device 412 and the access device 218 can exchange sensitive information (e.g., passwords, personal information), and remote access to the mobile device 412 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 412 in a single session without the need to start a new session (or handshaking) for each service requesting access to the mobile device 412.

Synchronization and Transfer of Digital Media Items

Figure 5:
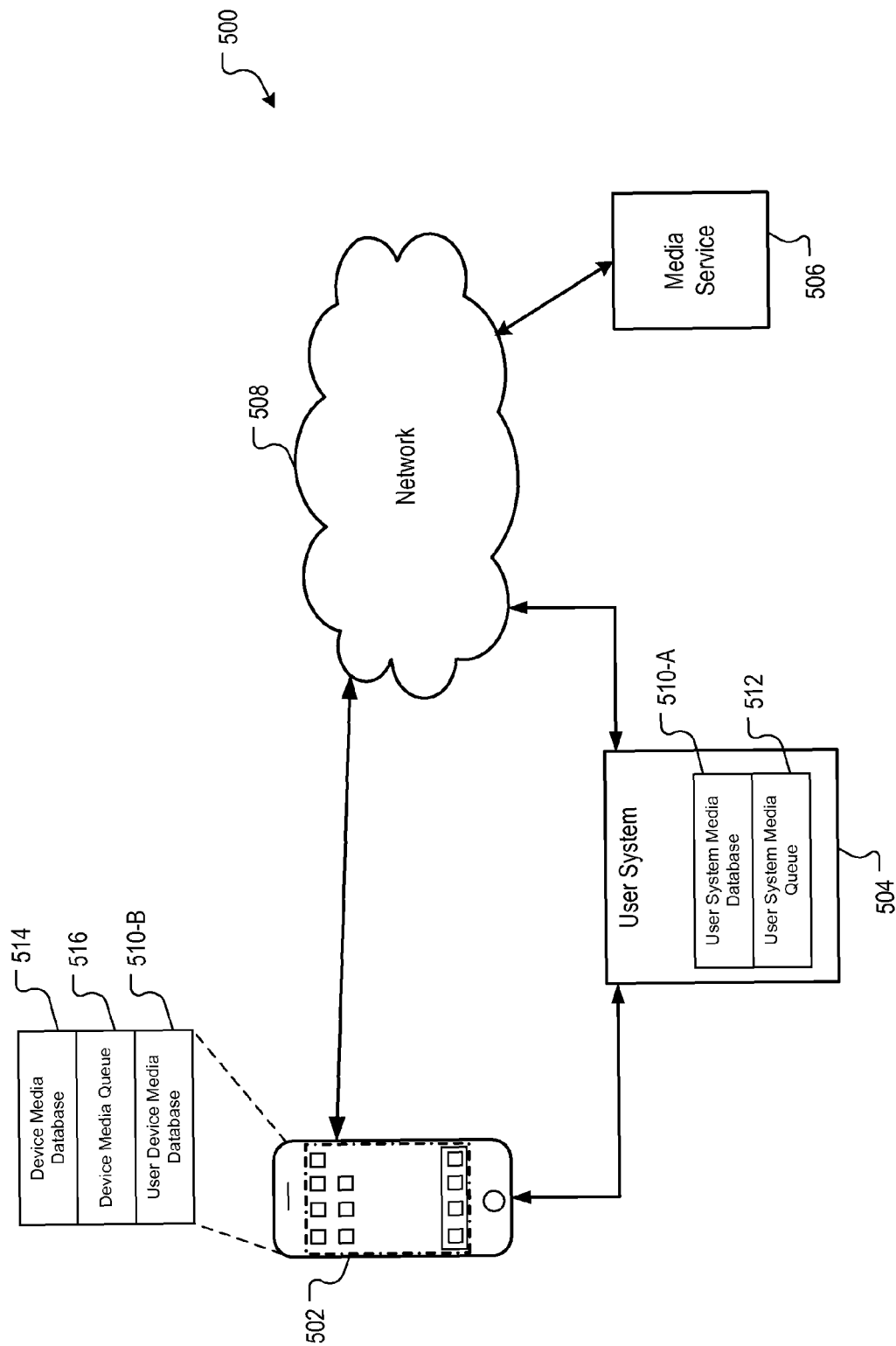
FIG. 5 is a block diagram illustrating an example media distribution environment.

FIG. 5 is a block diagram illustrating an example media distribution environment 500. The environment 500 includes a mobile device 502 and a user system 504. The user system 504 can access a network-accessible media service 506 (e.g., media service 250) over a network 508. The network 508 can be a wide area network (e.g., the network 214), the Internet, a LAN (local area network), or some other type of network. The user system 504 can be a desktop computer, a laptop computer, a server computer, another mobile device or an access point, to name a few examples. In some implementations, the user system 504 is an access device 218. In some implementations, the device 502 can also access the media service 506 over the network 508 (e.g., a wired or wireless network), bypassing the user system 504.

In FIG. 5, the mobile device 502 can be of the form of mobile device 100 or 101. In some implementations, the mobile device 502 can be physically connected to the user system 504 using one or more cables and optionally one or more docking stations physically connected to the user system 504 by one or more cables. In this configuration, the mobile device 502 can be referred to as a "tethered" device. In some other implementations, the mobile device 502 is connected to the user system 504 over one or more wireless networks.

In some implementations, the user system 504 can include a media application (not shown) that can communicate with the media service 506 and a tethered device 502. In some implementations, the media application is a mobile services application 420. The media application can allow a user to set preferences; download or update files of content (e.g., media items) or software; search databases; store user data; select services; browse content; perform financial transactions; copy, move, or synchronize content or software between the user system 504 and the device 502; acquire digital rights to content; play back or present media items; or engage in any other online service or function. An example of a media application is the iTunes™ client from Apple Inc. (Cupertino, Calif.).

The user system 504 can store one or more digital media items (referred to hereinafter as "media items"). Media items are digital data that pertain to visually or aurally perceived content. Examples of specific forms of media items include, but are not limited to, songs, movies, music, images, games, podcasts, movies, videos, audiobooks, etc.

In some implementations, information associated with the media items in the user system 504 can be stored in a user system media database 510-A. The user system media database 510-A can store characteristics, metadata or attributes of media items, such as title, album, track, artist, show, series, actors, directors, composer, genre, author, host, file size, bit rate, dimensions, aspect ratio, and total time, for example. The media application maintains the user system media database 510-A and allows the user to manage the media items and the media database.

In some implementations, the user system media database 510-A includes a queue or playlist 512 of purchased/requested data items to be downloaded to the user system 504 (referred to hereinafter as the "user system media queue"). The user system media queue 512 includes media items that have been requested from the media service 506, but have yet to be downloaded to the user system 504 from the media service 506.

The device 502 can communicate with the media service 506 and the media application on the user system 502. The device 502 can store copies of media items that are stored in the user system 504, and can include a copy of the user system media database 510-B. The device 502 can communicate with the media application on the user system 504 to copy one or more of the media items stored at the user system 504 and to synchronize the user system media database 510-B on the device 502 with the user system media database 510-A on the user system 504.

The device 502 also can store one or more data items that were requested from the media service 506 by the user through the device 502 and downloaded to the device 502, and which have yet to be copied or synchronized to the user system 504. The device 502 can include a device media database 514 for storing information associated with these media items that were requested from the media service 506 by the user through the device 502.

In some implementations, the device media database 514 includes a device media queue or playlist 516. The device media queue 516 includes media items that were requested from the media service 506 by the user through the device 502 but have yet to be downloaded to the device 502. In some implementations, the device media queue 516 includes pointers to media items.

Thus, the device 502 can include a copy of the user system media database 510-B and a device media database 514. The device media database 514 can include information that is not in the user system media database 510-B. In some implementations, information from the copy of the user system media database 510-B and the device media database 514 are presented to a user of the device 502 together, as if the information came from a single media database.

When the device 502 is tethered or otherwise coupled to the user system 504, information in the device media database 514 and the device media queue 516 can be synchronized with the user system media database 510-A and the user system media queue 512, respectively, on the user system 504. During synchronization, the user system media database 510-A and queue 512 are updated with information from the device media database 514 and queue 516, respectively, and the device media database 514 and queue 516 can be cleared. The media items that have been requested through the device 502 and downloaded to the device 502 are moved to the user system 504 and then moved back to the device 502. The updated user system media database 510-A can then be synchronized with the copy of the user system media database 510-B.

As described above, the device media queue 516 includes media items that were requested from the media service 506 through the device 502 but have yet to be downloaded to the device 502. If a media item in the device media queue 516 is not downloaded to the device 502 because the download process was interrupted, has not started, or is not allowed (e.g., is not allowed to be downloaded directly to the device), the media item can be downloaded to the user system 504 after the user system media queue 512 is updated with information from the device media queue 516. In other words, partial or not-started downloads to the device can be resumed or started on the user system.

In some implementations, media items in the user system media queue 512 and the device media queue 516 can include indications of where (the user system or the device) the request for the media item originated. In some implementations, the originator of the request is indicated by an identifier of the user system or device from which the request originated.

Figure 6:
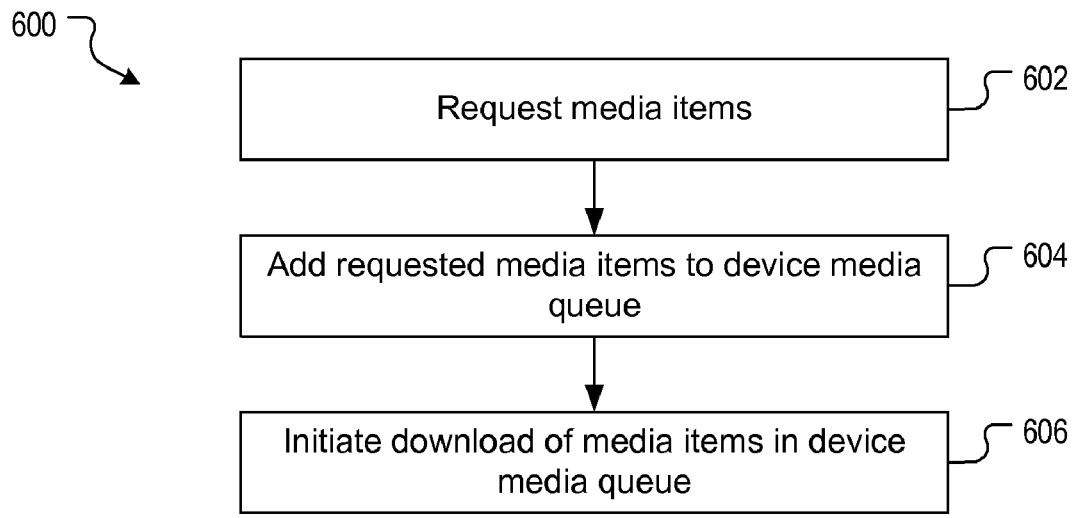
FIG. 6 is a flow diagram illustrating an example process for acquiring media items at a device.

FIG. 6 is a flow diagram illustrating an example process 600 for acquiring media items at a device. Process 600 begins with one or more media items requested from the media service 506 on the device 502 (602). A user can interact with the media service 506 on the device 502 through the network 508. For example, the user logs into the media service 506 with his account. The user can request one or more media items from the media service 506. For example, the user can make a request to the media service 506 to purchase or subscribe to one or more media items.

The requested media items are added to a device media queue 516 (604). In some implementations, a media item is added to the device media queue 516 when the request for the media item is processed by the media service 506. For example, if the user requested to purchase a media item, the media item is added to the device media queue 516 when the purchase request is processed.

Downloading of media items in the device media queue is initiated (606). In some implementations, media items in the device media queue 516 are downloaded to the device 502 in the queue order. In some other implementations, the media items are downloaded in some other order (e.g., an order set by the user). In some implementations, the user can modify the downloading order while a download is in progress; the media item being downloaded can be paused to accommodate another media item that the user has newly prioritized. A media item is removed from the device media queue 516 (i.e., the download is completed and the media item is playable on the device 502) when the file corresponding to the media item is transmitted in its entirety to the device 502 and, as required, digital rights management (DRM) is applied to the media item. If either the transmission of the file or the application of the DRM is interrupted or otherwise not complete, the media item is not considered downloaded and remains in the device media queue 516.

In some implementations, the download of a media item includes downloading the media item and any associated ancillary data. The associated ancillary data can include, for example, metadata (e.g., album and artist information) and other data (e.g., album cover art, movie poster art, liner notes, etc.). The ancillary data can be a part of the media item itself or in separate data files or objects associated with the media item. The ancillary data is added to the media database at which the media item(s) are downloaded.

In some implementations, media items of particular types that are in the device media queue 516 are not downloaded to the device 502. For example, some types of media items (e.g., movies, audiobooks) generally have sizes that make downloading to the device over a wireless connection to the media service 506 impractical. In some implementations, media items can be bypassed/delayed from being downloaded based on the sizes of the respective media items or the types of the respective media items. These media items remain in the queue 516 and can be downloaded to the user system, further details of which are described below.

Figure 7:
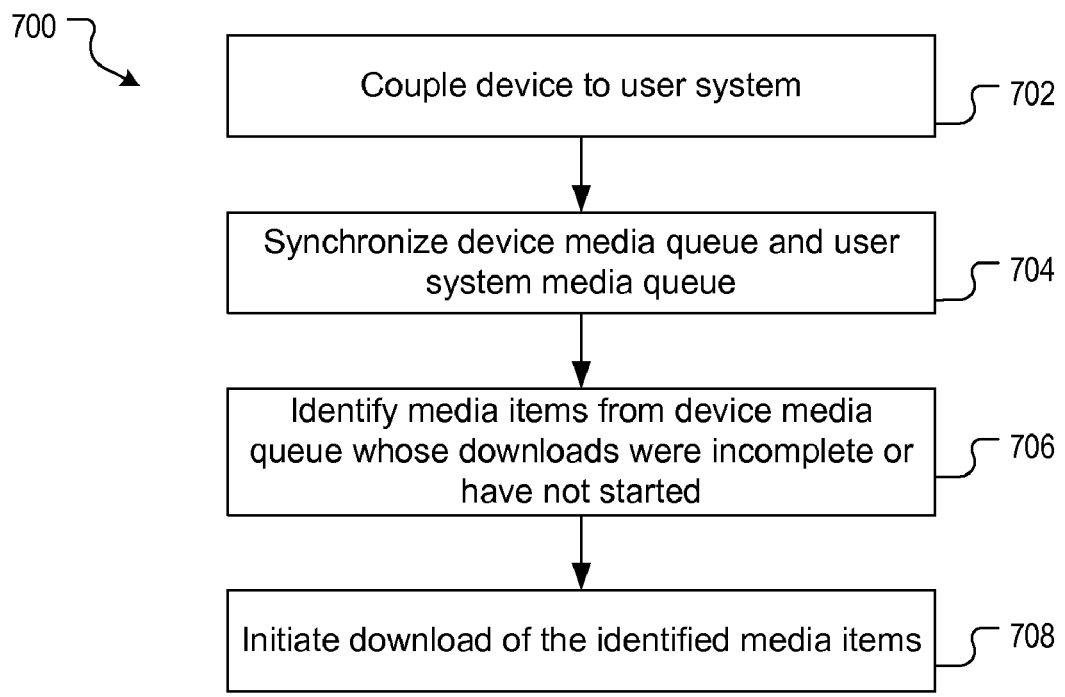
FIG. 7 is a flow diagram illustrating an example process for resuming partially downloaded media items or media items whose downloads have not started.

FIG. 7 is a flow diagram illustrating an example process for resuming partially downloaded media items or downloading media items whose downloads have not started. Process 700 begins with the device 502 coupled (e.g., tethered, wirelessly) to a user system 504 (702). The device 502 can be connected to the user system 504 through a cable or a docking station and cable or wirelessly, for example. The device 502 establishes communication with the media application (e.g., mobile services application 420) on the user system 504.

The device media queue 516 on the device 502 is synchronized with the user system media queue 510-A (704). The media items in the device media queue 516 are moved to the user system media queue 512. The media items that were moved from the device media queue 516 to the user system media queue 512 can include indications that they were originally requested through the device 502.

Media items in the updated system media queue 512 that originated from the device media queue 516 and which have yet to be downloaded completely are identified (706). These media items can be identified in the user system media queue based on the identifier of the original requesting device or user system, for example. The identified media items can be media items whose downloads were interrupted, not started, or not allowed due to download file size restrictions, for example.

Downloading of the media items identified above is initiated (708). An identified media item can be downloaded to the user system 504, and then synchronized to the device 502 after the download is complete. Downloads that were not completed on the device 502 can be completed on the user system 504, then subsequently synchronized.

In some implementations, the resumption or starting of downloads only occur in one direction. That is, incomplete or not-started downloads to the device can be resumed on the user system, but incomplete or not-started downloads to the user system are not resumed on the device. Alternatively, the media items can be downloaded directly to the device 502 and the user system 504 can be synchronized at a later time.

Figure 8:
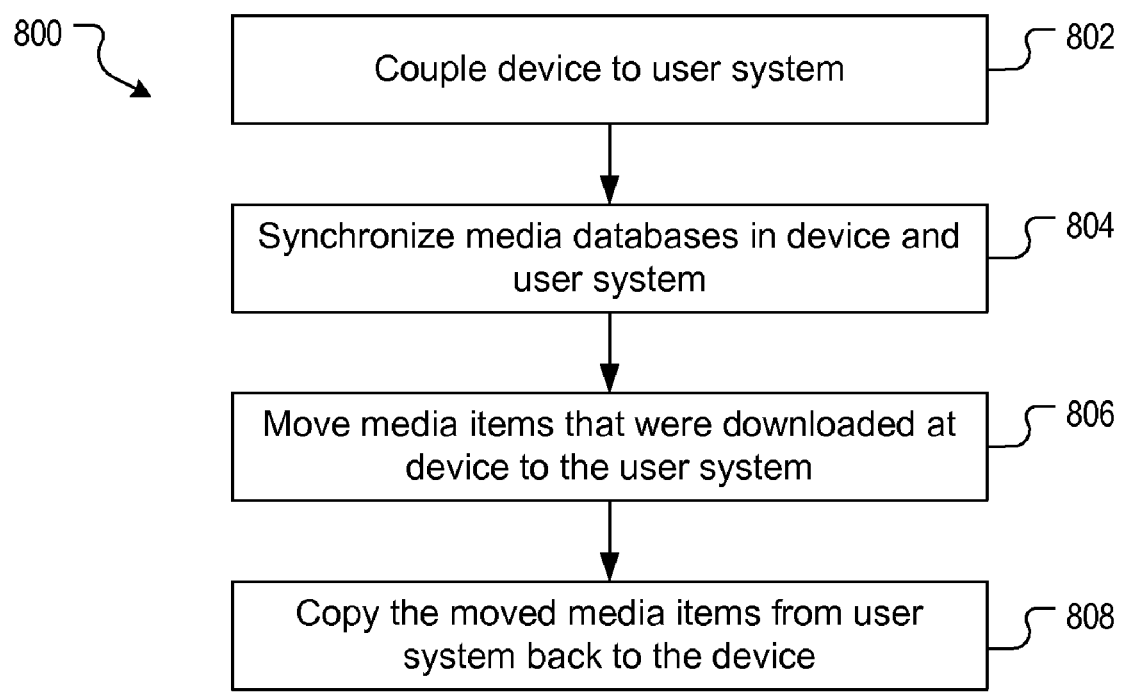
FIG. 8 is a flow diagram illustrating an example process for synchronizing media items between a user system and a device.

FIG. 8 is a flow diagram illustrating an example process 800 for synchronizing media items between a user system and a device. Process 800 begins with the device 502 coupled (e.g., tethered or wirelessly) to a user system 504 (802). The device 502 can be connected to the user system 504 through a cable, through a docking station connected to the user system 504 by a cable, or wirelessly, for example. The device 502 establishes communication with the media application (e.g., mobile services application 420) on the user system 504. Block 802 is the same as block 702 (FIG. 7).

The media databases in the user system and the device are synchronized (804). In some implementations, information in the device media database 514 is moved to the user system media database 510-A. The device media database 514 is cleared of information. The user system media database 510-B on the device is refreshed with the updated user system media database 510-A. In some implementations, blocks 804 and 704 can be performed serially or in parallel as parts of a synchronization process.

Media items that were downloaded to the device (as opposed to being copied from the user system) are moved to the user system (806). The moved media items are then copied back to the device (808).

The synchronization of the media databases and the moving of media items from the device to the user system and back to the device ensure that the user system media database 510-A includes the most updated information on media items requested by the user through the device and the user system, and that the user is not surprised by media items not appearing in the user system due to the device media queue not synchronizing with the user system.

In some implementations, the media databases 510-A, 510-B, and 514 include information on play counts for media items (i.e., how many times a media item has been played). When the media databases are synchronized, play count information in device media database 514 is moved to the user system media database 510-A along with the other information.

In some implementations, copies of the media databases and queues 510-A, 512, 514, and 516 are stored at the media service 506. These copies of the media databases and queues can be updated during the synchronization of the device and user system media databases and queues.

In some implementations, if a download to the device was interrupted or not started, the user can elect to have the download resumed or started at the device, as opposed to the user system in reference to FIG. 7 above. In this situation, after the information in the device media queue 516 is moved to the user system media queue 512, media items to be downloaded to the device are moved back into the device media queue 516.

In some implementations, a media item includes restrictions on access after a certain time has elapsed. For example, the media item can be unplayable after 72 hours from the first playback. In these implementations, if a restricted media item is downloaded to the device but not played back yet, the media item can be copied to the user system during synchronization with the period of allowed use unchanged.

In some implementations, a download of a media item to the device 502 over a wireless connection can be interrupted by a temporary loss of the wireless signal. For example, the device 502 can be out of range of a Wi-Fi network for a brief time and then go back into range of the Wi-Fi network. If a media item download was in progress over the wireless connection when the wireless signal is lost, the download can be automatically suspended until the device 502 reestablishes the wireless connection. The download can resume after reestablishment of the wireless connection. If the device 502 synchronizes with the user system 504 before the download resumes, the download is treated as an incomplete download and can be resumed on the user system 504 as described above.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
   receiving, from a media service, one or more media items at a mobile device, the mobile device having a first media database and a second media database;
   storing the one or more media items in the first media database on the mobile device, where the first media database stores only media items that were received at the mobile device and that have not been synchronized with another database;
   detecting when the mobile device is coupled to a second device;
   when the mobile device is coupled to the second device, updating a third media database on the second device with the one or more media items, including metadata associated with the one or more media items, from the first media database on the mobile device;
   upon updating the third media database, deleting the one or more media items from the first media database on the mobile device; and
   copying the one or more media items from the third media database on the second device to the second media database on the mobile device.

2. The method of claim 1, wherein the received one or more media items comprise an incompletely downloaded media item, the method further comprising:
   moving the incompletely downloaded media item from the first media database on the mobile device to the third media database on the second device, wherein a download of the incompletely downloaded media item that was initiated at the mobile device is completed at the second device after the moving; and
   copying the completely downloaded media item from the third media database on the second device to the second media database on the first device.

3. The method of claim 1, wherein the received one or more media items on the mobile device comprise an incompletely downloaded media item, the method further comprising:
   moving the incompletely downloaded media item from the first media database on the mobile device to the third media database on the second device;
   copying the incompletely downloaded media item from the third media database on the second device to the second media database on the mobile device; and
   completing a download of the incompletely downloaded media item at the mobile device.

4. The method of claim 1, wherein the second device is a computer to which the first device is docked.

5. The method of claim 1, wherein the metadata includes play counts or restrictions on access to the one or more media items.

6. A computer program product, encoded on a non-transitory tangible program carrier, operable to cause a portable device to perform operations comprising:
   receiving, from a network operating environment, one or more media items at the portable device, the portable device having a first media database and a second media database;
   storing the one or more media items in the first media database on the portable device, where the first media database stores only media items that were received at the mobile device and that have not been synchronized with another database;
   detecting when the mobile device is coupled to a second device;
   when the mobile device is coupled to the second device, updating a third media database on the second device with the one or more media items, including metadata associated with the one or more media items, with from the first media database on the mobile device;
   upon updating the third media database, deleting the one or more media items from the first media database on the portable device; and
   copying the one or more media items from the third media database on the second device to the second media database on the portable device.

7. The computer program product of claim 6, wherein moving the one or more media items from the first media database on the portable device to the third media database on the second device comprises:
copying the one or more media items from the first media database on the portable device to the third media database on the second device; and
deleting the one or more media items from the first media database on the portable device.

8. The computer program product of claim 6, wherein the received one or more media items comprise an incompletely downloaded media item, the computer program product further operable to cause the portable device to perform operations comprising:
moving the incompletely downloaded media item from the first media database on the portable device to the third media database on the second device, wherein a download of the incompletely downloaded media item that was initiated at the mobile device is completed at the second device after the moving; and
copying the completely downloaded media item from the third media database on the second device to the second media database on the portable device.

9. The computer program product of claim 6, wherein the received one or more media items on the first device comprise an incompletely downloaded media item, the computer program product further operable to cause the portable device to perform operations comprising:
moving the incompletely downloaded media item from the first media database on the portable device to the third media database on the second device;
copying the incompletely downloaded media item from the third media database on the second device to the second media database on the portable device; and
completing a download of the incompletely downloaded media item at the portable device.

10. A portable device, comprising:
one or more processors;
a first media database;
a second media database; and
a computer-readable medium storing instructions for execution by the one or more processors, the instructions comprising instructions to:
receiving, from a media service, one or more media items;
storing the one or more media items in the first media database, where the first media database stores only media items that were received at the mobile device and that have not been synchronized with another database;
detecting when the portable device is coupled to a second device;
updating a third media database on the second device with the one or more media items, including metadata associated with the one or more media items, from the first media database on the portable device;
upon updating the third media database, deleting the one or more media items from the first media database; and
copying the one or more media items from the third media database on the second device to the second media database.

11. The device of claim 10, further comprising instructions to:
move an incompletely downloaded media item to the third media database on the second device, wherein a download of the incompletely downloaded media item that was initiated at the mobile device is completed at the second device after the moving; and
copy the completely downloaded media item from the third media database on the second device to the second media database.

12. The device of claim 10, further comprising instructions to:
move an incompletely downloaded media item from the first media data base to the third media database on the second device;
copy the incompletely downloaded media item from the third media database on the second device to the second media database; and
complete a download of the incompletely downloaded media item.

* * * * *